United States Patent
Han (10) Patent No.: US 10,888,812 B2
(45) Date of Patent: Jan. 12, 2021

(54) AIR CLEANING DEVICE

(71) Applicant: Dae Gon Han, Daejeon (KR)

(72) Inventor: Dae Gon Han, Daejeon (KR)

(*) Notice: Subject to any disclaimer, the term of this patent is extended or adjusted under 35 U.S.C. 154(b) by 335 days.

(21) Appl. No.: 15/778,740

(22) PCT Filed: Oct. 10, 2016

(86) PCT No.: PCT/KR2016/011286
§ 371 (c)(1),
(2) Date: May 24, 2018

(87) PCT Pub. No.: WO2017/090884
PCT Pub. Date: Jun. 1, 2017

(65) Prior Publication Data
US 2020/0269177 A1    Aug. 27, 2020

(30) Foreign Application Priority Data

Nov. 24, 2015  (KR) .................. 10-2015-0164944

(51) Int. Cl.
*B01D 46/10* (2006.01)
*B01D 53/34* (2006.01)
(Continued)

(52) U.S. Cl.
CPC ..... *B01D 46/4263* (2013.01); *B01D 46/0002* (2013.01); *B01D 46/0027* (2013.01);
(Continued)

(58) Field of Classification Search
CPC ............... B01D 46/4263; B01D 46/00; B01D 46/0027; B01D 46/0061;
(Continued)

(56) References Cited

U.S. PATENT DOCUMENTS

2014/0353230 A1*  12/2014  Klein ............... H05B 3/146
                                                       210/185
2015/0004063 A1    1/2015  Lee

FOREIGN PATENT DOCUMENTS

JP      59-173515 A     10/1984
JP      05-156927 A  *   6/1993  ............... F01N 3/02
(Continued)

OTHER PUBLICATIONS

Japanese Notice of Allowance issued on Aug. 6, 2019 in counterpart Japanese Patent Application No. 2018-545787 (2 pages in English and 2 Japanese).

(Continued)

*Primary Examiner* — Minh Chau T Pham
(74) *Attorney, Agent, or Firm* — NSIP Law (57) ABSTRACT

An air cleaning device is disclosed. A first opening and closing member opens and closes an inlet of a housing. A second opening and closing member opens and closes an outlet of the housing. A first filter unit collects and separates foreign substances from contaminated air in the housing. A circulation tube has a first end portion disposed at the inlet to communicate with the housing and a second end portion disposed at the outlet to communicate with the housing. A third opening and closing member opens and closes the circulation tube. A first heater is installed inside the circulation tube to heat air in the circulation tube. A blower is installed inside the circulation tube to deliver air from the circulation tube into the housing.

5 Claims, 7 Drawing Sheets

(51) Int. Cl.
 *B01D 53/81* (2006.01)
 *F01N 3/02* (2006.01)
 *F24F 7/06* (2006.01)
 *B01D 46/42* (2006.01)
 *B01D 46/00* (2006.01)

(52) U.S. Cl.
 CPC .. *B01D 46/0061* (2013.01); *B01D 2258/0275* (2013.01); *B01D 2259/4591* (2013.01)

(58) Field of Classification Search
 CPC .... B01D 2258/0275; B01D 2259/4591; B01D 46/10; B01D 53/34; B01D 53/81; F01N 3/02; F24F 7/06
 USPC ........................................................ 123/198 E
 See application file for complete search history.

(56) References Cited

FOREIGN PATENT DOCUMENTS

| | | |
|---|---|---|
| JP | 5-156927 A | 6/1993 |
| JP | 5-240027 A | 9/1993 |
| JP | 5-332124 A | 12/1993 |
| JP | 09-089332 A * | 4/1997 ................ F24F 7/06 |
| JP | 9-89332 A | 4/1997 |
| JP | 10-131740 A * | 5/1998 ............... F01N 3/02 |
| JP | 2005-279570 A | 10/2005 |
| JP | 2011-104547 A | 6/2011 |
| KR | 0145808 B1 | 8/1998 |
| KR | 10-2004-0089869 A | 10/2004 |

OTHER PUBLICATIONS

Japanese Office Action dated Apr. 2, 2019 in counterpart Japanese Patent Application No. 2018-545787 (7 pages in English and 3 pages in Japanese).

Extended European Search Report dated Jun. 24, 2019 in counterpart European Patent Application No. 16868783.8 (8 pages in English).

International Search Report dated Jan. 13, 2017, in corresponding International Application No. PCT/KR2016/011286 (2 pages in English, 3 pages in Korean).

* cited by examiner

AIR CLEANING DEVICE

CROSS REFERENCE TO RELATED APPLICATION(S)

This application is a U.S. National Stage Application of International Application No. PCT/KR2016/011286, filed on Oct. 10, 2016, which claims the benefit under 35 USC 119(a) and 365(b) of Korean Patent Application No. 10-2015-0164944, filed on Nov. 24, 2015, in the Korean Intellectual Property Office.

TECHNICAL FIELD

The present invention relates to an air cleaning device configured to communicate with a duct to collect foreign substances in contaminated air and then discharge purified air.

BACKGROUND ART

Generally, an air conditioning system for forcibly suctioning contaminated indoor air to discharge the contaminated indoor air to the outside is basically provided in a home or a business. Specifically, the air conditioning system suctions the contaminated indoor air through a hood mounted above a kitchen table or a suction fan mounted on a ceiling or a wall, and then discharges the suctioned contaminated air to the outside through a duct.

Meanwhile, an air cleaning device in which multiple plate type filters such as a pre-filter, a carbon filter, a HEPA filter, and the like are sequentially disposed is installed in the duct to remove foreign substances contained in the suctioned contaminated air.

However, based on a configuration of each of the above-described various filters, the filter type air cleaning device installed in the conventional duct tends to focus on filtering dirt and the like contained in the contaminated air. Accordingly, based on the filter type air cleaning device, cleaning soot, smell, bacteria, and the like which are contained in the contaminated air does not seem to be performed. Further, since the filter of the filter type air cleaning device has to be cleaned and changed, maintenance costs are high, and when a cleaning state is poor, air cleaning efficiency sharply decreases.

DISCLOSURE

Technical Problem

The present invention is directed to providing an air cleaning device configured to not only clean contaminated air which contains foreign substances such as soot and the like, but also improve air cleaning efficiency.

Technical Solution

One aspect of the present invention provides an air cleaning device including a housing, first and second opening and closing members, a first filter unit, a circulation tube, a third opening and closing member, a first heater, and a blower. The housing has an inner space, an inlet formed on one side thereof through which contaminated air is introduced from the indoor space, and an outlet formed on an opposite side thereof through which purified air is discharged to the outside. The first opening and closing member opens and closes the inlet. The second opening and closing member opens and closes the outlet. The first filter unit collects and separates foreign substances from the contaminated air in the housing and is disposed so that both end portions thereof each face the inlet and the outlet in a state in which an outer peripheral portion of the first filter unit is hermetically sealed with an inner peripheral portion of the housing. The circulation tube has a first end portion disposed at the inlet to communicate with the housing, and a second end portion disposed at the outlet to communicate with the housing. The third opening and closing member opens and closes the circulation tube. The first heater is installed inside the circulation tube to heat air in the circulation tube. The blower is installed inside the circulation tube to deliver the air in the circulation tube into the housing.

Advantageous Effects

According to the present invention, since contaminated air is heated in a circulation tube and the heated air is circulated through a first filter unit to be cleaned, foreign substances such as soot and the like, in addition to dirt contained in the contaminated air, can be removed, and smell in the contaminated air can be also removed. Further, since the heated air is circulated to be supplied to a whole area of the first filter unit, the foreign substances collected in the first filter unit can be uniformly removed, and thus air cleaning efficiency can be improved and inconvenience caused by frequently changing the first filter unit can be reduced.

In addition, according to the present invention, when a second filter unit coated with a catalyst which decreases a combustion temperature of the foreign substances is disposed in the circulation tube, incompletely combusted smoke and the like can be combusted and removed.

MODES OF THE INVENTION

The present invention will be described below in detail with reference to the accompanying drawings. Here, the same reference numerals are used for the same components in the description, and repeated descriptions and a detailed description for known functions and configurations which may unnecessarily obscure the spirit of the present invention will be omitted. Embodiments of the present invention are provided to more completely describe the present invention to those skilled in the art. Accordingly, a shape, a size and the like of elements in the drawings may be exaggerated for more clear description.

Figure 1:
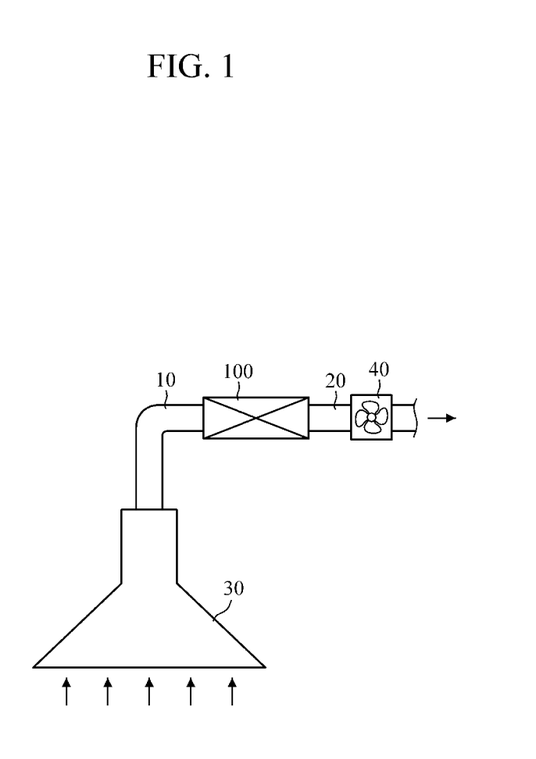
FIG. 1 is a configuration diagram illustrating an example in which an air cleaning device according to an embodiment of the present invention is applied to first and second ducts.
Figure 2:
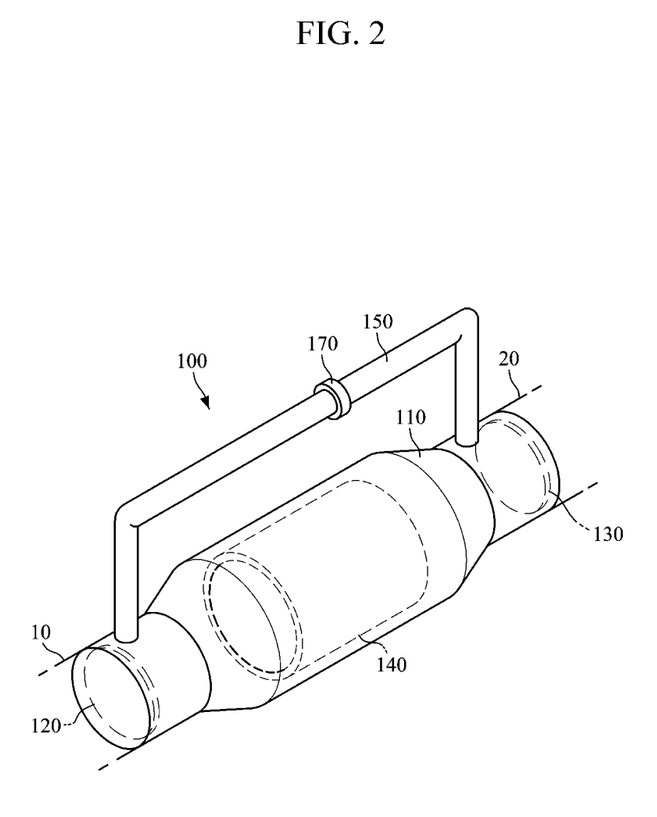
FIG. 2 is a perspective view of the air cleaning device according to the embodiment of the present invention.
Figure 3:
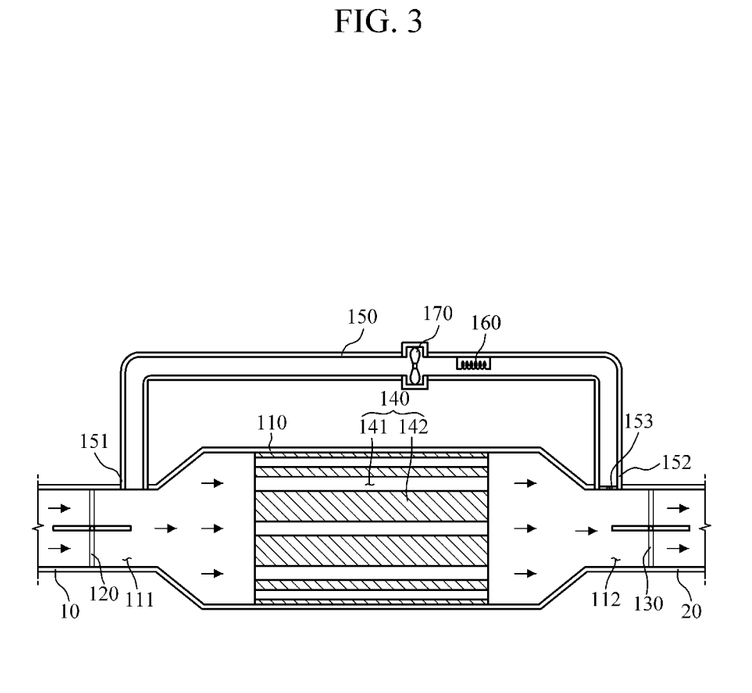
FIG. 3 is a cross-sectional view of FIG. 2.
Figure 4:
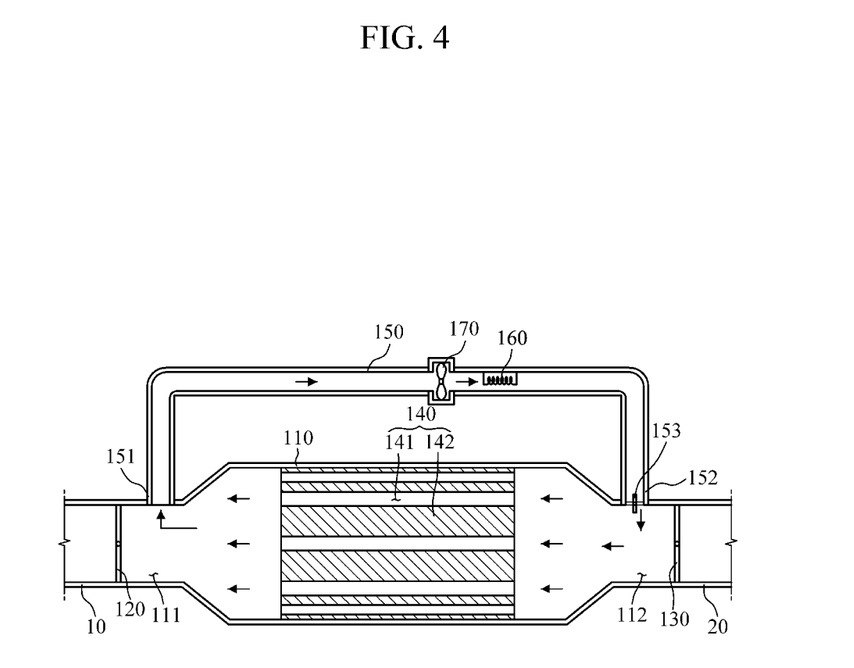
FIG. 4 is a view for describing a process of heating contaminated air in a circulation tube and circulating the heated air through a first filter unit in FIG. 3.

FIG. 1 is a configuration diagram illustrating an example in which an air cleaning device according to an embodiment of the present invention is applied to first and second ducts. FIG. 2 is a perspective view of the air cleaning device according to the embodiment of the present invention. FIG. 3 is a cross-sectional view of FIG. 2. FIG. 4 is a view for describing a process of heating contaminated air in a circulation tube and circulating the heated air through a first filter unit in FIG. 3.

First, as shown in FIG. 1, an air cleaning device 100 according to an embodiment of the present invention may be installed between a first duct 10 and a second duct 20. Generally, contaminated indoor air is suctioned through a hood 30 mounted above a kitchen table of a home or a business, or a ventilator mounted on a ceiling or a wall, and then discharged. In this case, a suction force is provided by a suction fan 40 installed on the second duct 20, and the indoor air, which is suctioned by securing a moving path through the first and second ducts 10 and 20, may be discharged to the outside.

The air cleaning device 100 according to the embodiment of the present invention may remove foreign substances from the contaminated air introduced from an indoor space through the first duct 10, and then discharge the purified air to the outside through the second duct 20. Of course, the air cleaning device 100 may be separately installed to be used instead of being installed on an air delivering path such as that of each of the first and second ducts 10 and 20.

As shown in FIGS. 2 to 4, the air cleaning device 100 according to the embodiment of the present invention includes a housing 110, first and second opening and closing members 120 and 130, a first filter unit 140, a circulation tube 150, a third opening and closing member 153, a first heater 160, and a blower 170.

The housing 110 has an inner space, an inlet 111 formed on one side thereof through which the contaminated air is introduced from the indoor space, and an outlet 112 formed on an opposite side thereof through which the purified air is discharged to the outside. When the housing 110 is installed between the first duct 10 and the second duct 20, the inlet 111 may communicate with the first duct 10 to introduce the contaminated air. The outlet 112 may communicate with the second duct 20 to discharge the purified air. The outlet 112 may be exposed to the outside without connection to the second duct 20.

A center portion of the housing 110 may be formed in a cylindrical shape. Accordingly, the housing 110 has a structure in which a hollow having a predetermined size in a longitudinal direction is formed along a length direction. Both end portions of the housing 110 may have a diameter smaller than that of the center portion and an extending shape to each be connected to the first and second ducts 10 and 20. The housing 110 may be formed in a shape having a polygonal cross section instead of a circular cross section.

The first opening and closing member 120 opens and closes the inlet 111. The first opening and closing member 120 opens the inlet 111 so that the contaminated air is introduced into the housing 110. While the contaminated air is circulated in the housing 110 through the circulation tube 150 and cleaned, the first opening and closing member 120 maintains a state in which the inlet 111 is closed. The first opening and closing member 120 may be rotatably coupled around the inlet 111 by a hinge shaft and operated by a rotating actuator (not shown) to open and close the inlet 111.

The second opening and closing member 130 opens and closes the outlet 112. While the contaminated air is circulated in the housing 110 through the circulation tube 150 and cleaned, the second opening and closing member 130 maintains a state in which the outlet 112 is closed. The second opening and closing member 130 may open the outlet 112 so that the purified air is discharged. The second opening and closing member 130 may be rotatably coupled around the outlet 112 by a hinge shaft and operated by a rotating actuator (not shown) to open and close the outlet 112.

The first filter unit 140 collects and separates the foreign substances from the contaminated air in the housing 110. The first filter unit 140 is disposed so that both end portions of the first filter unit 140 each face the inlet 111 and the outlet 112 in a state in which an outer peripheral portion of the first filter unit 140 is hermetically sealed with an inner peripheral portion of the housing 110.

The first filter unit 140 may be formed in a shape corresponding to a shape of the center portion of the housing 110. When the center portion of the housing 110 has a cylindrical shape, the first filter unit 140 may be formed in the cylindrical shape. The first filter unit 140 may include a plurality of paths 141 through which the contaminated air which is introduced into the housing 110 passes. Here, the paths 141 are arranged to be parallel to a longitudinal direction of the first filter unit 140. The paths 141 may be partitioned by partitions 142.

The first filter unit 140 may be formed of a porous material to collect particles contained in the contaminated air. For example, the first filter unit 140 may include a ceramic honeycomb including at least one material among carbide silicon (SiC), codierite, and alumina, which are porous ceramic materials. Alternatively, the first filter unit 140 may be formed of a ceramic nonwoven fabric filter, including a ceramic fiber made of the above described material.

The circulation tube 150 has a first end portion 151 disposed at the inlet 111 to communicate with the housing 110, and a second end portion 152 disposed at the outlet 112 to communicate with the housing 110. The air introduced into the housing 110 may be circulated in the housing 110 and the circulation tube 150.

The third opening and closing member 153 opens and closes the circulation tube 150. The third opening and closing member 153 may be disposed to open and close the second end portion 152 of the circulation tube 150. The third opening and closing member 153 may be rotatably coupled around an opening of the second end portion 152 of the circulation tube 150 by a hinge shaft and operated by a rotating actuator (not shown) to open and close the second end portion 152 of the circulation tube 150.

The first heater 160 is installed inside the circulation tube 150 to heat the air in the circulation tube 150. The first heater 160 may include a heater using an electric heating wire. The first heater 160 may be configured to heat the air in the circulation tube 150 to roughly 550° C. The air heated by the first heater 160 may be delivered into the housing 110 by the blower 170 which will be described below and heat the first filter unit 140 while passing through the first filter unit 140. Accordingly, the foreign substances collected in the first filter unit 140 such as soot and the like may be combusted and removed, and smell in the contaminated air may also be removed.

The blower 170 is installed inside the circulation tube 150 to deliver the air in the circulation tube 150 into the housing 110. The blower 170 acts to deliver the air heated in the circulation tube 150 by the first heater 160 into the housing 110, and suction the air in the housing 110 into the circulation tube 150.

Accordingly, the air heated by the first heater 160 may be circulated in the housing 110 and the circulation tube 150. In this process, since the heated air is circulated to be supplied to a whole area of the first filter unit 140, the foreign substances collected in the first filter unit 140 may be uniformly removed and the first filter unit 140 may be processed to be reusable, and thus inconvenience caused by frequently changing the first filter unit 140 may be reduced. The blower 170 is exemplified to be disposed between the first end portion 151 of the circulation tube 150 and the first heater 160, but may also be disposed between the second end portion 152 of the circulation tube 150 and the first heater 160.

The blower 170 may suction the air into the circulation tube 150 from the first end portion 151 of the circulation tube 150, and then deliver the air into the housing 110 through the second end portion 152 of the circulation tube 150. An indoor pressure may be lower than a pressure in the housing 110 at the inlet 111 in the state in which the first opening and closing member 120 closes the inlet 111, but the pressure in the housing 110 at the inlet 111 may be decreased when the air introduced into the housing 110 is suctioned into the circulation tube 150 through the first end portion 151 of the circulation tube 150.

Accordingly, leakage of the air in the housing 110 to the indoor space may be prevented by reducing a difference between the indoor pressure and the pressure in the housing 110 at the inlet 111. Meanwhile, while the contaminated air is circulated through the circulation tube 150 and cleaned, the blower 170 may be operated to occasionally suction the air from the second end portion 152 of the circulation tube 150 and deliver the air through the first end portion 151 of the circulation tube 150, and thus an air circulation direction may be reversed.

An operating example of the air cleaning device 100 will be described below. First, during the daytime when contaminated air is relatively more generated in the indoor space, the contaminated indoor air is introduced into the housing 110 through the inlet 111 by the suction fan 40 shown in FIG. 1 in a state in which the inlet 111 of the housing 110 is opened by the first opening and closing member 120, the outlet 112 of the housing 110 is opened by the second opening and closing member 130, and the circulation tube 150 is closed by the third opening and closing member 153 as shown in FIG. 3. The contaminated air introduced into the housing 110 is filtered through the first filter unit 140 and then discharged through the outlet 112.

Meanwhile, as shown in FIG. 4, during the nighttime when contaminated air is relatively less generated in the indoor space, the inlet 111 of the housing 110 is closed by the first opening and closing member 120, the outlet 112 of the housing 110 is closed by the second opening and closing member 130, and the circulation tube 150 is opened by the third opening and closing member 153. In this state, the air in the housing 110 is suctioned into the circulation tube 150 through the first end portion 151 of the circulation tube 150 by the blower 170 and then delivered into the housing 110 through the second end portion 152 of the circulation tube 150. In this case, the air introduced into the circulation tube 150 is heated by the first heater 160 and delivered into the housing 110. The air delivered into the housing 110 heats the first filter unit 140 to a high temperature while passing through the first filter unit 140. In this case, the foreign substances collected in the first filter unit 140 such as the soot and the like during the daytime may be combusted and removed, and the smell in the contaminated air may also be removed. Further, the air in the housing 110 may also be processed to be cleaned again.

The air which passes through the first filter unit 140 may heat the first filter unit 140 and combust the foreign substances in the first filter unit 140 while being circulated along the above-described moving path, and then be processed to be cleaned. When a cleaning process of the air in the housing 110 is completed, the outlet 112 is opened by the second opening and closing member 130, and thus the purified air may be discharged to the outside.

Due to the air cleaning device 100, since contaminated air is heated in the circulation tube 150, and the heated air is processed to be cleaned in a method of circulating the air through the first filter unit 140, the foreign substances such as the soot and the like, in addition to dirt contained in the contaminated air, may be removed, and the smell in the contaminated air may be also removed. Further, since the heated air is circulated to be supplied to the whole area of the first filter unit 140, the foreign substances collected in the first filter unit 140 may be uniformly removed, and thus air cleaning efficiency may be improved and inconvenience caused by frequently changing the first filter unit 140 may be reduced.

Figure 5:
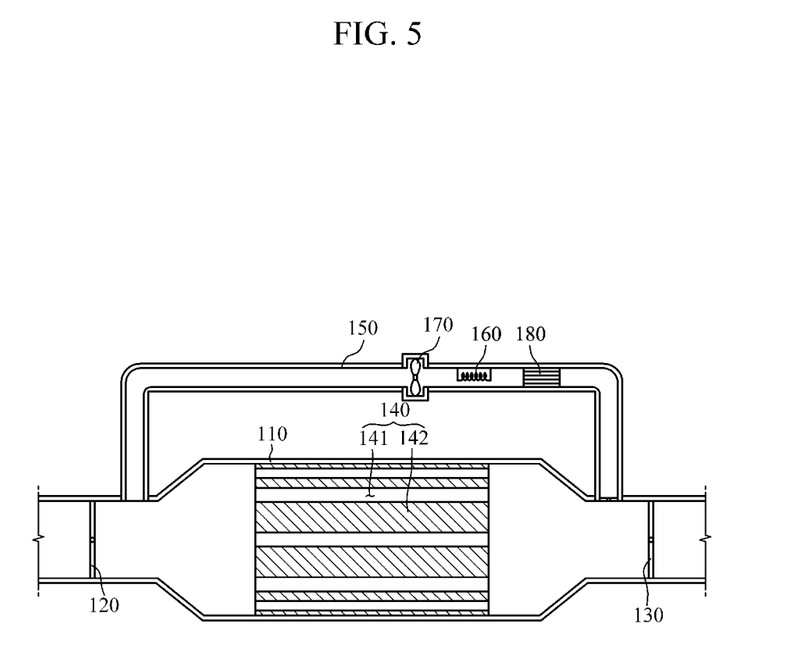
FIG. 5 is a cross-sectional view illustrating an example in which a second filter unit is further provided in FIG. 2.

As shown in FIG. 5, a second filter unit 180 may be further provided in the circulation tube 150. The second filter unit 180 collects and separates the foreign substances from the contaminated air in the circulation tube 150. The second filter unit 180 may include a ceramic honeycomb the same as that in the first filter unit 140. The second filter unit 180 is exemplified to be disposed between the second end portion 152 of the circulation tube 150 and the first heater 160, but is not limited thereto.

A catalyst for decreasing a combustion temperature of the collected foreign substances may be coated on the second filter unit 180. Here, the catalyst may act to combust the foreign substances collected in the second filter unit 180 at roughly 220° C. The catalyst may include an oxidized catalyst, or the like. The oxidized catalyst may be formed of a metal oxide such as platinum (Pt), paladium (Pd), rhodium (Rh), etc. Since the above-described catalyst is coated on the second filter unit 180, even when incompletely combusted smoke or the like is collected in the second filter unit 180, the collected smoke may be combusted to be removed. The above-described catalyst may also be coated on the first filter unit 140.

Figure 6:
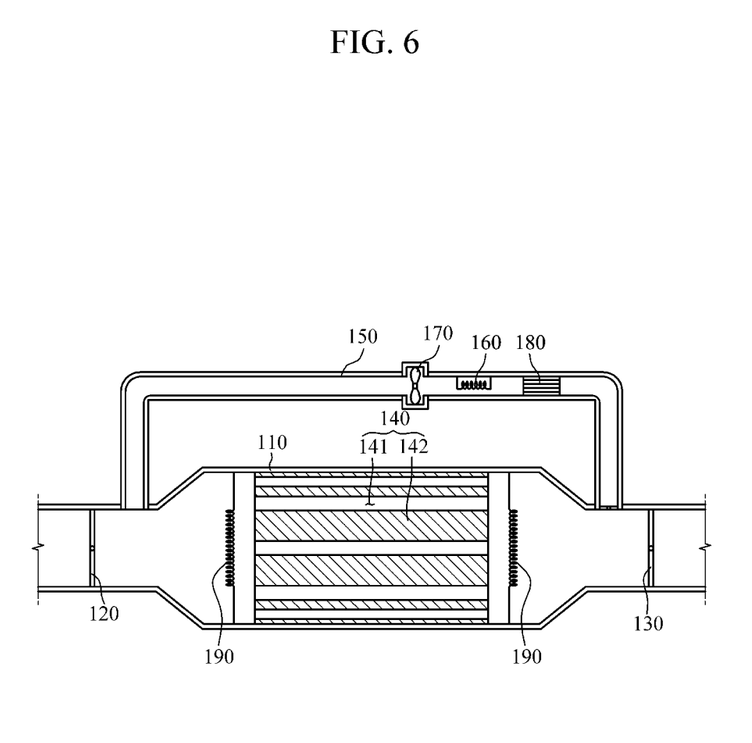
FIG. 6 is a cross-sectional view illustrating a state in which a second heater according to one example is further provided in FIG. 2.

As shown in FIG. 6, second heaters 190 may be further provided in the housing 110. The second heaters 190 are installed in the housing to heat both end portions of the first filter unit 140. The second heaters 190 may be disposed adjacent to both end portions of the first filter unit 140. One of the second heaters 190 may be omitted. Each of the second heaters 190 may include a heater using an electric heating wire, or a heater using microwaves.

Figure 7:
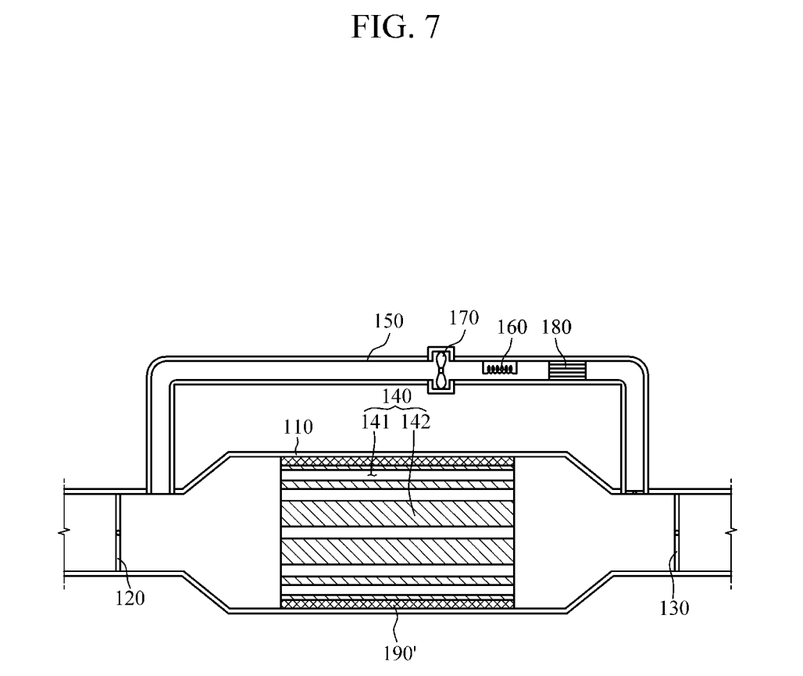
FIG. 7 is a cross-sectional view illustrating a state in which a second heater according to another example is further provided in FIG. 2.

As shown in FIG. 7, as another example, a second heater 190' may be formed in a surface-type heating mode. The second heater 190' is installed between the outer peripheral portion of the first filter unit 140 and inner peripheral portion of the housing 110 to heat the outer peripheral portion of the first filter unit 140. When the first filter unit 140 is formed in a cylindrical shape, the second heater 190' may be formed to be curved with a curvature the same as that of the first filter unit 140. Accordingly, the second heater 190' may have surface contact with the first filter unit 140 to uniformly heat the first filter unit 140. The second heater 190' may be divided in plural and arranged in a circumferential direction. Meanwhile, the second heaters 190 as shown in FIG. 6 may be additionally installed in the housing 110 to heat at least one end portion of the first filter unit 140.

Although the present invention is described with reference to embodiments shown in the accompanying drawings, the above descriptions are only exemplary embodiments, and it should be understood by those skilled in the art that various changes and other equivalent embodiments may be made from the above descriptions. Accordingly, the scope of the present invention should be defined by the scope of the claims and their equivalents.

The invention claimed is:

1. An air cleaning device comprising:
    a housing having an inner space, an inlet formed on one side thereof through which contaminated air is introduced from an indoor space and an outlet formed on an opposite side thereof through which purified air is discharged to the outside;
    a first opening and closing member configured to open and close the inlet;
    a second opening and closing member configured to open and close the outlet;
    a first filter unit configured to collect and separate foreign substances from the contaminated air in the housing and disposed so that one end portion of the first filter unit faces the inlet and the other end portion of the first filter unit faces the outlet in a state in which an outer peripheral portion of the first filter unit is hermetically sealed with an inner peripheral portion of the housing;
    a circulation tube having a first end portion disposed at the inlet to communicate with the housing, and a second end portion disposed at the outlet to communicate with the housing;
    a third opening and closing member configured to open and close the circulation tube;
    a first heater installed inside the circulation tube to heat air in the circulation tube; and
    a blower installed inside the circulation tube to deliver the air in the circulation tube into the housing;
    wherein the circulation tube is configured to suction the air into the circulation tube from the housing through the first end portion disposed at the inlet and circulate the air through the first filter unit of the housing when said inlet and outlet of the housing are closed by the first and second opening and closing members and the circulation tube is opened by the third opening and closing member.

2. The air cleaning device of claim 1, wherein the blower suctions the air into the circulation tube from the first end portion of the circulation tube, and then delivers the air into the housing through the second end portion of the circulation tube.

3. The air cleaning device of claim 1, further comprising a second filter unit configured to collect and separate the foreign substances from the contaminated air in the circulation tube,
    wherein a catalyst is coated on the second filter unit to combust the foreign substances collected in the second filter unit, and the catalyst is a metal oxide of platinum (Pt), palladium (Pd), or rhodium (Rh).

4. The air cleaning device of claim 1, further comprising a second heater installed in the housing to heat both end portions of the first filter unit.

5. The air cleaning device of claim 1, further comprising a second heater installed between the outer peripheral portion of the first filter unit and the inner peripheral portion of the housing which is hermetically sealed with the outer peripheral portion of the first filter to heat the outer peripheral portion of the first filter unit.

* * * * *